(12) United States Patent
Ravichandrasekaran et al.

(10) Patent No.: US 12,719,950 B2
(45) Date of Patent: Aug. 25, 2026

(54) EFFICIENT ONE-SIDED COMMUNICATION IN A DISTRIBUTED SYSTEM

(71) Applicant: Hewlett Packard Enterprise Development LP, Spring, TX (US)

(72) Inventors: Naveen Namashivayam Ravichandrasekaran, St. Paul, MN (US); Nathan L. Wichmann, Plymouth, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 60 days.

(21) Appl. No.: 18/822,750

(22) Filed: Sep. 3, 2024

(65) Prior Publication Data

US 2026/0067360 A1 Mar. 5, 2026

(51) Int. Cl.
*G06F 15/16* (2006.01)
*H04L 67/1097* (2022.01)

(52) U.S. Cl.
CPC ................................ *H04L 67/1097* (2013.01)

(58) Field of Classification Search
CPC ................................................... H04L 67/1097
See application file for complete search history.

(56) References Cited

U.S. PATENT DOCUMENTS 8,769,036 B2 7/2014 Frey et al.
9,058,122 B1 * 6/2015 Nesbit ................. G06F 16/1844
9,229,901 B1 * 1/2016 Nesbit ................... G06F 3/0659
11,520,486 B2 * 12/2022 Sahin .................... G06F 3/0664
12,177,135 B2 * 12/2024 Li ......................... H04L 49/356
2012/0158882 A1 * 6/2012 Oehme .................. G16H 30/20 709/213
2015/0154127 A1 * 6/2015 Squires ................... G06F 9/455 703/25
2015/0234776 A1 * 8/2015 Tamir .................... G06F 13/385 709/212
2017/0163731 A1 * 6/2017 Borlick ................. G06F 3/0637
2018/0188974 A1 * 7/2018 Cayton ................. G06F 3/0655
2018/0341653 A1 * 11/2018 Teotia ............... G06F 15/17331
2020/0136996 A1 * 4/2020 Li ......................... H04L 47/125
2022/0231905 A1 * 7/2022 Dhatchinamoorthy ..................... H04L 41/0668

(Continued)

OTHER PUBLICATIONS

Dinan, J., et al.; "Reducing Synchronization Overhead Through Bundled Communication"; Nov. 18, 2013; 15 pages.

(Continued)

*Primary Examiner* — Razu A Miah
(74) *Attorney, Agent, or Firm* — Yao Legal Services, Inc.

(57) ABSTRACT

A computing node in a distributed system is provided. During operation, the node can send, from a source process using direct memory transfer, a first set of data elements from a source buffer to a NIC of a target node executing a target process. These processes may be among a plurality of processes performing a distributed operation across a set of nodes. Subsequent to sending the first set of data elements, the node can receive respective acknowledgments for the first set of data elements from the NIC. The node can then send, to the NIC of the target node, a flush instruction to trigger the delivery of pending data elements to a destination buffer of the target process. The node can send, from the source process, a control message to the target process indicating that the first set of data elements is available to the target process.

20 Claims, 10 Drawing Sheets

(56) References Cited

U.S. PATENT DOCUMENTS

| | | | | |
|---|---|---|---|---|
| 2022/0377054 | A1* | 11/2022 | Shukla | H04L 63/0428 |
| 2023/0061873 | A1* | 3/2023 | Margolin | H04L 67/1097 |
| 2023/0066835 | A1 | 3/2023 | Singh et al. | |
| 2023/0229470 | A1* | 7/2023 | Zhou | G06F 9/4401 718/1 |

OTHER PUBLICATIONS

Hsu, C. H., et al.; "Assessment of NVSHMEM for High Performance Computing"; Nov. 4, 2020; 24 pages.

Welch, A., et al.; "Extending OpenSHMEM with Aggregation Support for Improved Message Rate Performance"; Aug. 1, 2023; 3 pages.

* cited by examiner

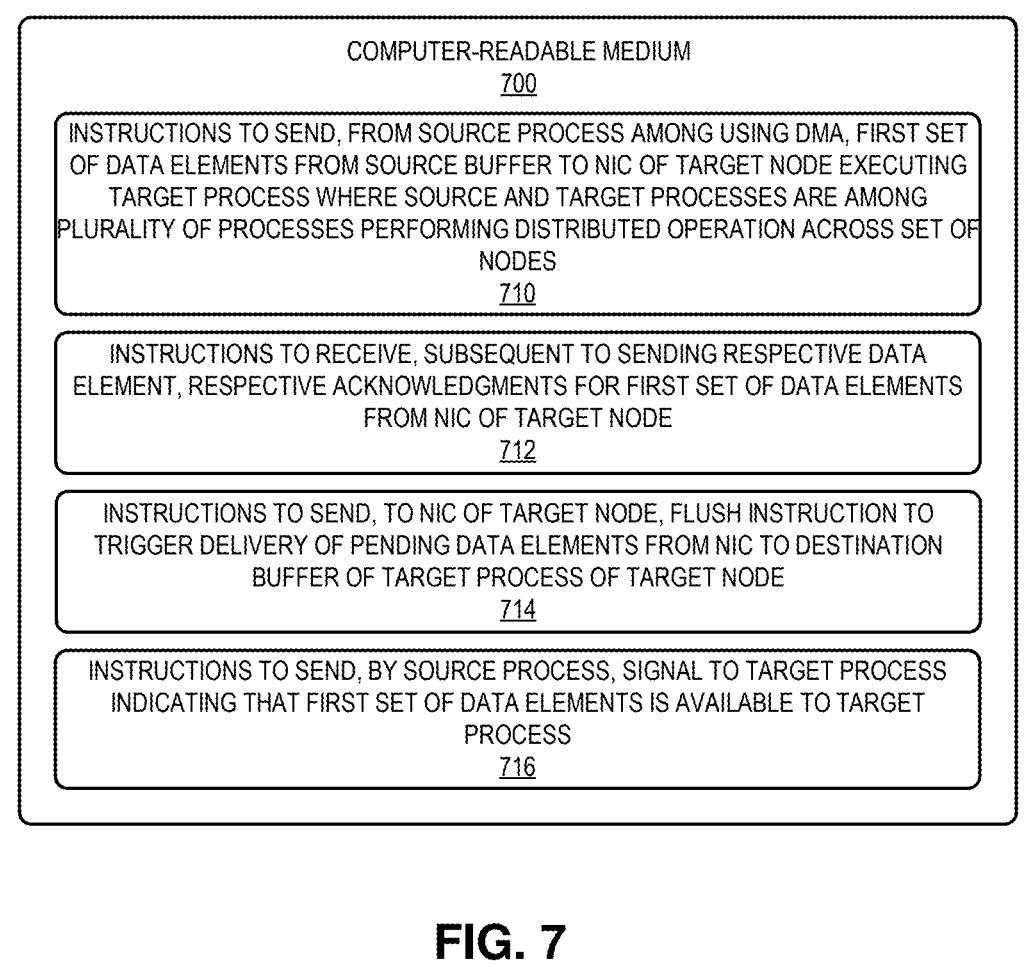

COMPUTER-READABLE MEDIUM
700

INSTRUCTIONS TO SEND, FROM SOURCE PROCESS AMONG USING DMA, FIRST SET OF DATA ELEMENTS FROM SOURCE BUFFER TO NIC OF TARGET NODE EXECUTING TARGET PROCESS WHERE SOURCE AND TARGET PROCESSES ARE AMONG PLURALITY OF PROCESSES PERFORMING DISTRIBUTED OPERATION ACROSS SET OF NODES
710

INSTRUCTIONS TO RECEIVE, SUBSEQUENT TO SENDING RESPECTIVE DATA ELEMENT, RESPECTIVE ACKNOWLEDGMENTS FOR FIRST SET OF DATA ELEMENTS FROM NIC OF TARGET NODE
712

INSTRUCTIONS TO SEND, TO NIC OF TARGET NODE, FLUSH INSTRUCTION TO TRIGGER DELIVERY OF PENDING DATA ELEMENTS FROM NIC TO DESTINATION BUFFER OF TARGET PROCESS OF TARGET NODE
714

INSTRUCTIONS TO SEND, BY SOURCE PROCESS, SIGNAL TO TARGET PROCESS INDICATING THAT FIRST SET OF DATA ELEMENTS IS AVAILABLE TO TARGET PROCESS
716

FIG. 7

EFFICIENT ONE-SIDED COMMUNICATION IN A DISTRIBUTED SYSTEM

BACKGROUND

A distributed system may support a high-performance computing (HPC) environment for facilitating efficient computation on the nodes running an application. Typically, such a distributed system can include a network that can support high-speed data transfer between sender and receiver devices.

BRIEF DESCRIPTION OF THE FIGURES

FIG. 7 illustrates an example of a computer-readable medium (CRM) facilitating efficient one-sided communication in a distributed system, in accordance with an aspect of the present application.

In the figures, like reference numerals refer to the same figure elements.

DETAILED DESCRIPTION

Figure 1A:
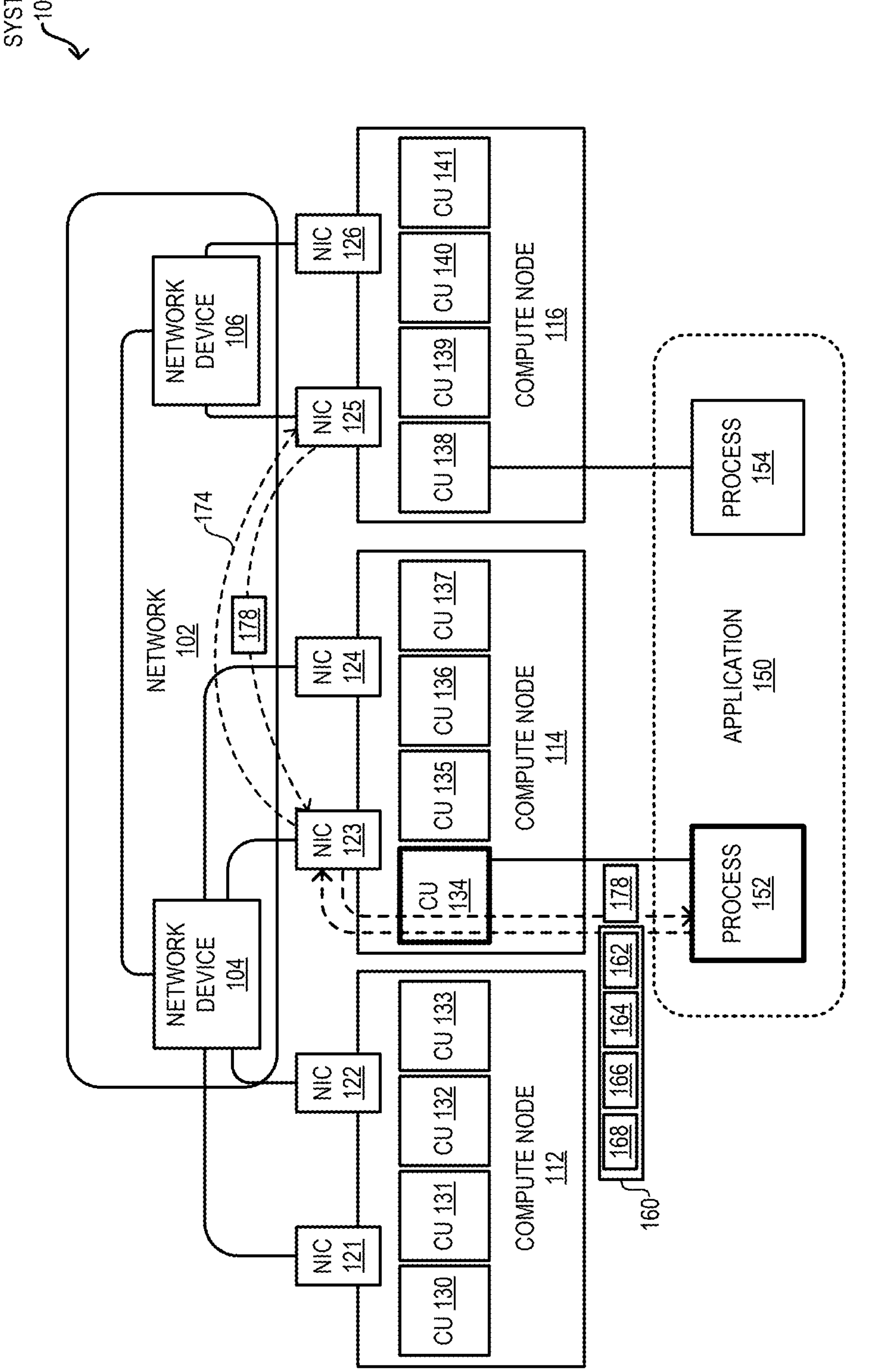
FIG. 1A illustrates an example of a distributed system supporting efficient one-sided communication, in accordance with an aspect of the present application.

As applications become progressively more computationally demanding, an application may execute on a distributed system to attain better performance. The distributed system may provide an HPC environment, which can include compute nodes (e.g., server blades), storage nodes, and high-capacity network devices as part of a high-bandwidth and low-latency network. The nodes may run one or more processes in parallel, the output of which may be stored on the storage nodes. In addition, data from one compute node may be used by another compute node. Therefore, the nodes can operate in conjunction with each other to facilitate high-performance computing in a distributed manner.

One or more processes may be executed on computing units, such as processor cores and accelerators, of a node. The data elements generated by the computations may be transferred to another node using a network interface controller (NIC) of the node. Such transfers may include a remote direct memory access (RDMA) operation. Typically, a source process can transfer the data elements from a source buffer (e.g., a buffer in the source node) to a destination buffer of a target process running on the receiving node. Some of these transfers may include one-sided communication where the source process transfers data to the destination buffer without participation by the target process. The source process may perform one-sided communication for random and irregular transfers. One-sided communication may be executed in batches, which can be referred to as epochs.

The aspects described herein address the problem of efficiently performing one-sided communication in a distributed system by (i) upon receiving a data element from the source process, sending an acknowledgment from the NIC of the target node prior to delivering the data element to the destination buffer; and (ii) sending a flush instruction from the source process to the NIC of the target node for delivering any pending data elements associated with the epoch to the destination buffer. Currently, the NIC of the target node sends an acknowledgment when the data element is delivered to the destination buffer. To improve efficiency, the NIC of the target node can send the acknowledgment for the data element prior to delivering the data element to the destination buffer. Since the acknowledgment can be sent without waiting for the additional time taken to ensure delivery to the destination buffer, the NIC may speed up the transfer process. Furthermore, the flush instruction causes all data elements associated with the epoch to be delivered to the destination buffer so that the data elements of the subsequent epoch can be transferred.

To ensure in-order delivery of the data elements across epochs, data transfers for an epoch are to be completed before data transfers for the next epoch are initiated. For one-sided communication, the source process may confirm the completion of the data transfers for a respective epoch for individual target processes. Typically, the source process executing on a source node can insert a data element into a source buffer (e.g., in the memory of the source node). The NIC of the source node can obtain the data element from the source buffer and send the data element to the NIC of the target node. The NICs of the source and target nodes can be referred to as source and target NICs, respectively. In some examples, these NICs can be coupled to the source and target nodes via respective peripheral component interconnect express (PCIe) interfaces. The source and target nodes can then be equipped with respective PCIe systems that can manage the PCIe operations on these nodes.

Upon receiving the data element from the source NIC, the target NIC may store the data element for execution in a queue, such as a PCIe bar of the target node. Subsequently, the data element can be delivered to a destination buffer associated with the target process from the queue (e.g., by the PCIe system). When the data element is stored in the queue, the target NIC can wait for a notification from the PCIe system indicating the delivery of the data element to the destination buffer. Upon receiving the notification, the target NIC can issue a corresponding delivery-complete acknowledgment, which indicates that the data element has been delivered to the destination buffer. A delivery-complete acknowledgment is generally issued after the data element is stored in the destination buffer and may incur additional delay at the target node. When the computations are large and distributed among a significant number of processes, the additional delays associated with the delivery-complete acknowledgments can accumulate and may adversely impact the performance of the distributed operation.

Typically, the network in a distributed system may include an inter-node fabric, such as Slingshot, InfiniBand, or Elastic fabric. A respective node may include one or more computing units, such as a core of a central processing unit (CPU), a graphics processing unit (GPU), a tensor processing unit (TPU), and a field-programmable gate array (FPGA). A respective process may be executed on one of the computing units. The computing units within a node may be interconnected using an intra-node interconnect such as NVLink, Infinity fabric, XeLinks, and QuickPath interconnects. A respective node may also include multiple NICs. Typically, a respective NIC of a node may be associated with a subset of the computational units located in close proximity (e.g., on the backplane or motherboard of the node). Existing communication techniques may not utilize the architecture of the nodes for efficient distribution of the data elements.

To address this issue, the source NIC may sequentially send a set of data elements associated with an epoch and wait for acknowledgments while the entire set is being sent. Accordingly, when the source process provides a data element to the source NIC, the source NIC may send the data element to the target NIC without waiting for an acknowledgment for a previous data element, which can speed up the data transmission. To send the data element to the destination buffer, the source NIC can issue an RDMA PUT request. Based on the RDMA PUT request, the source NIC can send the data element to the target NIC, which can then store the data element in a queue.

To ensure efficient transmission, the target NIC may send the acknowledgment upon receiving the data element without waiting for the notification from the PCIe system indicating the delivery of the data element to the destination buffer. In other words, the target NIC may send the acknowledgment prior to delivering the data element to the destination buffer. The target NIC may send the acknowledgment when the transmission of the data element is complete (e.g., the data element is stored in the cache of the target NIC). Here, the acknowledgment can indicate that the transmission is complete but may not indicate the data delivery to the destination buffers is complete. Therefore, the acknowledgment can be referred to as a transmission-complete acknowledgment. Since the target NIC can generate the acknowledgment upon completion of the transmission of the data element, sending the transmission-complete acknowledgment instead of a delivery-complete acknowledgment can speed up the data delivery process. When the source NIC receives the acknowledgment, it can provide the acknowledgment to the source process.

The distribution operation may be associated with a plurality of target processes. The source NIC can then repeat this one-sided communication process for a respective target process. Accordingly, when the source NIC sequentially sends the set of data elements associated with the epoch, a respective target NIC may send corresponding transmission-complete acknowledgments. The transmission-complete acknowledgments may not guarantee the completion of the delivery to the destination buffer. Hence, even when the target NIC has received the entire set of data elements, some data elements may not be delivered to the destination buffer.

To ensure that the entire set of data elements is delivered to the destination buffer, the source process can send a "flush" instruction to the target NIC. In particular, when the source NIC receives the acknowledgment for the last data element of the set, the source NIC can provide the acknowledgment to the source process. At this point, the source process may receive respective acknowledgments for the set of data elements associated with the epoch. The source process can then issue the flush instruction and provide it to the source NIC. In some examples, the flush instruction may be based on an RDMA PUT request with a predetermined size of payload (e.g., an RDMA PUT request without a payload or a zero-payload RDMA PUT request).

The source NIC can then send the flush instruction to the target NIC. Upon receiving the flush instruction, the target NIC can provide the flush instruction to the PCIe system. The flush instruction may include an instruction for the PCIe system to complete the flush operation. Since the PCIe system can deliver the data elements to the destination buffer in order, the PCIe system can flush all pending data elements from the queue and deliver the data elements to the destination buffer of the target process. Since the flush instruction can be used to deliver data elements to the target process, the acknowledgment for the flush instruction can be a delivery-complete acknowledgment. Consequently, upon receiving the delivery-complete acknowledgment, the source NIC can determine that the pending data elements are delivered to the destination buffer.

To further enhance the process, the source process may issue flush instructions for individual NICs instead of individual processes. As a result, if a target NIC is associated with a plurality of processes, the flush instruction can cause the target NIC to deliver any pending data elements to corresponding destination buffers of all such target processes. Here, a target NIC can be associated with a process if the computing unit executing the process is associated with the target NIC. In this way, the flush operation can utilize the architecture of the nodes to efficiently flush all processes associated with the target NIC using a single flush instruction. The source process may then signal, by sending a control message, the target processes to consume (or retrieve) the data elements from corresponding destination buffers. In this way, all data elements can be delivered to the target processes while using transmission-complete acknowledgments instead of delivery-complete acknowledgments.

In some examples, a target process may receive data elements from a plurality of source processes. If these source processes issue respective flush operations to the target process, the target NIC may incur incast. In a network, incast can occur when a plurality of senders send data or instructions (e.g., flush instructions) to a receiver at the same time. Incast at the target process can cause contention since the target process may try to retrieve data elements sent from multiple source processes. To reduce contention among the source processes, a respective source process can sequentially send the flush operations to the target processes that have a greater process identifier. For example, a process with an identifier N may start sending flush instructions to the NIC associated with the target process with an identifier N+1. Hence, even when multiple source processes issue the flush instructions, the instructions can be issued to different NICs. In this way, one-sided communication from multiple sources processes in a distributed system may avoid incast.

FIG. 1A illustrates an example of a distributed system supporting efficient one-sided communication, in accordance with an aspect of the present application. A distributed system 100 can include compute nodes 112, 114, and 116. Distributed system 100 may include a network 102 that can couple compute nodes 112, 114, and 116 to each other. A respective compute node can include one or more computing units, such as CPUs, GPUs, and TPUs. Furthermore, a respective node can be equipped with a plurality of NICs. The computing units and the NICs in a node can be coupled to each other via corresponding intra-node interconnects (e.g., CPU interconnects, such as NVLink, Infinity fabric, XeLinks, or QuickPath interconnects).

In this example, node 112 can include computing units 130, 131, 132, and 133, and NICs 121 and 122; node 114 can include computing units 134, 135, 136, and 137, and NICs 123 and 124; and node 116 can include computing units 138, 139, 140, and 141, and NICs 125 and 126. Network 102 may include an inter-node fabric, such as Slingshot, InfiniBand, or Elastic fabric. A respective NIC can be coupled to the corresponding nodes via respective PCIe interfaces. Nodes 112, 114, and 116 can then be equipped with respective PCIe systems that can manage the PCIe operations on these nodes. Nodes 112, 114, and 116 may operate in conjunction with each other via network 102 to facilitate an HPC environment.

Here, network 102 may include a set of network devices 104 and 106. Node 112 can be coupled to network device 104 via NICs 121 and 122. Even though NICs 121 and 122 can be coupled to the same network 102, they provide distinct inter-node links that can transfer data simultaneously. Similarly, node 114 can be coupled to network device 102 via NICs 123 and 124, and node 116 can be coupled to network device 106 via NICs 125 and 126. Currently, large-scale computations associated with a distributed operation of an application 150 can be distributed among a plurality of processes of application 150. These processes may be executed on corresponding computing units. For example, processes 152 and 154 of application 150 can execute on computing units 134 and 138, respectively.

The computations of application 150 may involve random and irregular data transfer between processes 152 and 154. Here, process 152 may be a source process (denoted with increased line weight) sending data elements from a source buffer to the destination buffer of process 154, which can be a target process. Here, the source and destination buffers can be in the memory of nodes 114 and 116, respectively. Data transfers for application 150 may be executed in epochs. A respective epoch may include the transfer of one or more data elements. For example, a set of data elements 160 is associated with an epoch. Process 152 may complete data transfers for the epoch before initiating data transfers for another epoch. To do so, process 152 can send data elements 160 to process 154 using one-sided communication. Process 152 can insert a data element 164 of data elements 160 into a source buffer (e.g., maintained in node 112). NIC 123 may obtain data element 164 from the source buffer and send data element 164 to NIC 125 of node 116. In some examples, NIC 123 may send data element 164 to the destination buffer via an RDMA PUT request 174.

Upon receiving data element 164 from NIC 123, NIC 125 may store the data element in a queue. The PCIe system of compute node 116 can then deliver data element 164 from the queue to a destination buffer associated with process 154. When the PCIe system notifies NIC 125 regarding the delivery to the destination buffer, NIC 125 can send a delivery-complete acknowledgment. When the computations for application 150 are large, the additional delays associated with the delivery-complete acknowledgments can accumulate and may adversely impact the performance of application 150. Furthermore, since nodes 112, 114, and 116 include multiple NICs, a respective NIC may be associated with a subset of the computational units. For example, in node 114, computing units 134 and 135 can be associated with NIC 123, and computing units 136 and 137 can be associated with NIC 124 (e.g., based on physical closeness on the backplane or motherboard of node 114). Similarly, in node 116, computing units 138 and 139 can be associated with NIC 125, and computing units 140 and 141 can be associated with NIC 126.

To address this issue, NIC 123 may sequentially send data elements 160, such as data elements 162, 164, 166, and 168, and wait for acknowledgments while the entire set is being sent. Accordingly, when process 152 provides data element 164 to NIC 123, NIC 123 may send data element 164 to NIC 125 without waiting for an acknowledgment for a previous data element 162. Sending data element 164 without waiting for the acknowledgment for data element 162 can speed up the data transmission process. To further enhance the efficiency of the transmission, NIC 125 may send a transmission-complete acknowledgment 178 upon receiving data element 164 (e.g., based on RDMA PUT request 174) without waiting for a corresponding notification from the PCIe system of node 116. Hence, NIC 125 can send transmission-complete acknowledgment 178 prior to delivering data element 164 to the destination buffer associated with process 154. Since NIC 125 can generate acknowledgment 178 upon completion of the transmission of data element 164, sending acknowledgment 178 instead of a delivery-complete acknowledgment can speed up the data delivery process for data element 164. In addition, upon receiving data element 166 from process 152, NIC 123 may send data element 166 to NIC 125 without waiting for acknowledgment 178.

Figure 1B:
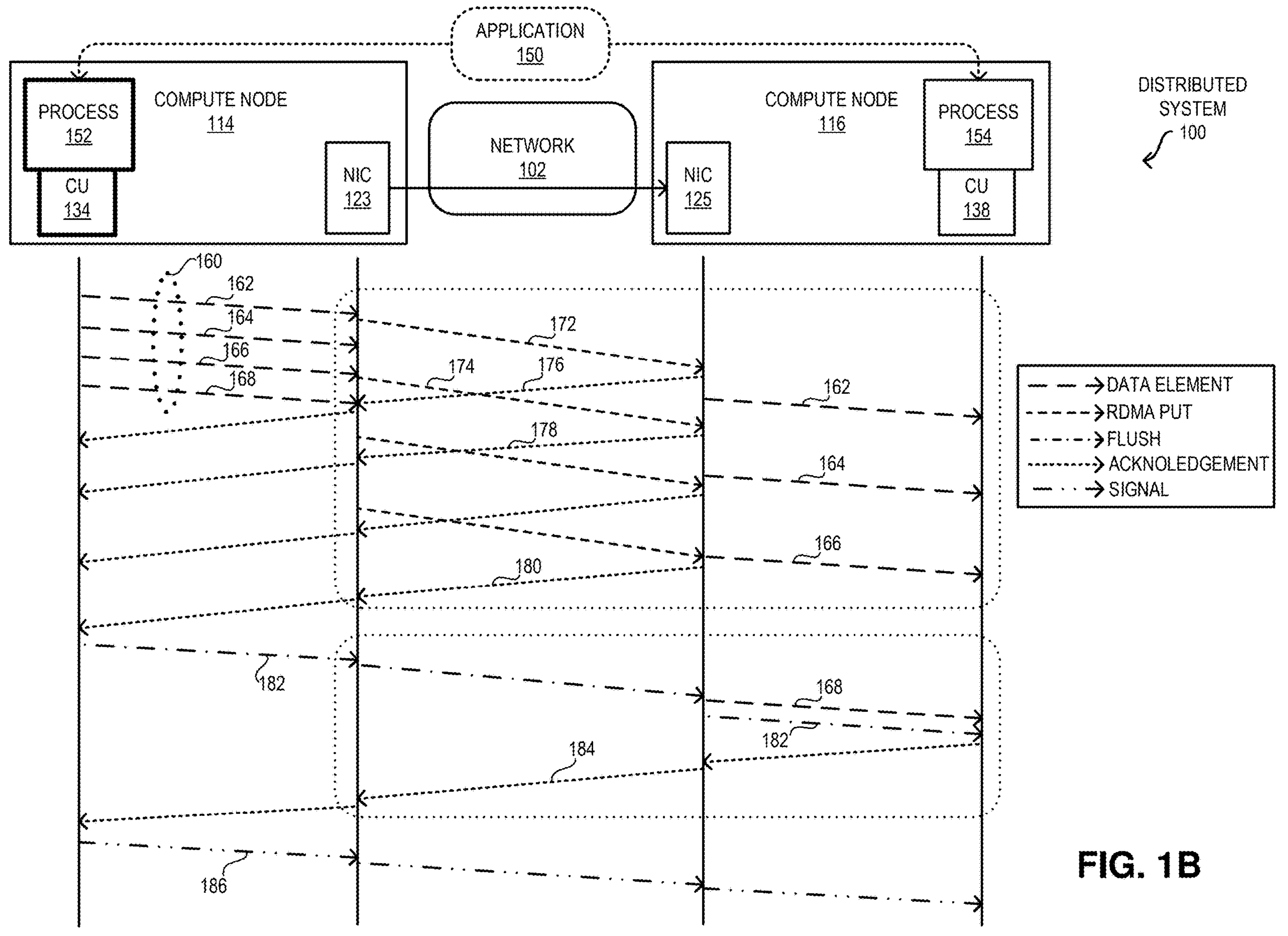
FIG. 1B illustrates an example of efficient one-sided communication in a distributed system, in accordance with an aspect of the present application.

FIG. 1B illustrates an example of efficient one-sided communication in a distributed system, in accordance with an aspect of the present application. NIC 123 can sequentially send data elements 162, 164, 166, and 168 without waiting for a preceding acknowledgment. For example, process 152 can place data element 162 in a source buffer and notify NIC 123. The notification can include the location of data element 162 in the source buffer. NIC 123 can then obtain data element 162 from the source buffer and send it to NIC 125 using RDMA PUT request 172. When NIC 125 receives data element 162, NIC 125 can send acknowledgment 176. Process 152 can also place data element 164 in the source buffer. NIC 123 can obtain data element 164 from the source buffer and send it to NIC 125 using RDMA PUT request 174. Nonetheless, NIC 123 can send data element 164 upon retrieving it from the source buffer without waiting for acknowledgment 176. Similarly, NIC 123 can send data element 166 upon retrieving it from the source buffer without waiting for acknowledgment 178 of data element 164, as described in conjunction with FIG. 1A.

Upon receiving acknowledgments 176 and 178, NIC 123 can provide them to process 152. Accordingly, process 152 can determine that data elements 162 and 164, respectively, have been delivered to NIC 125. However, acknowledgments 176 and 178 may not guarantee the completion of the delivery to the destination buffer of process 154. In this example, NIC 125 may deliver data elements 162, 164, and 166 to the destination buffer associated with process 154 by the time process 152 receives acknowledgments for data elements 162, 164, 166, and 168. To ensure that the entire set of data elements 160 is delivered to the destination buffer, process 152 can send a flush instruction to the target NIC 182.

In particular, process 152 can wait for respective acknowledgments of data elements 162, 164, 166, and 168. When NIC 123 receives acknowledgment 180 for data element 168, which can be the last data element in the set of data elements 160, NIC 123 can provide acknowledgment 180 to process 152. Since all data elements in the set of data elements 160 may be acknowledged, process 152 can determine that the transmission for data elements 160 is complete. Process 152 can then issue flush instruction 182 and provide it to NIC 123. In some examples, flush instruction 182 may be based on a zero-payload RDMA PUT request (e.g., an RDMA PUT request without a payload) with an instruction for the PCIe system to complete the flush operation. NIC 123 can then send flush instruction 182 to NIC 125. Upon receiving flush instruction 182, NIC 125 can provide the flush instruction to the PCIe system of node 116. The PCIe system can then deliver any pending data elements, such as data element 168, from the queue (e.g., the PCIebar) to the destination buffer of process 154.

Since flush instruction 182 can be used to deliver data elements to the destination buffer of process 154, NIC 125 can generate corresponding acknowledgment 184 when the zero payload of flush instruction 182 is delivered to process 154. Therefore, acknowledgment 184 can be a delivery-complete acknowledgment. Consequently, upon receiving acknowledgment 184, NIC 125 can determine that the entire set of data elements 160 are delivered to the destination buffer. Process 152 may then send a signal 186 to process 154 to consume (or retrieve) data elements 162, 164, 166, and 168 from the destination buffer. Signal 186 may be included in a control message supported by application 150 and may indicate that the data transfers associated with the epoch are complete. In this way, all data elements can be delivered to process 154 while using transmission-complete acknowledgments, such as acknowledgments 176 and 178, instead of delivery-complete acknowledgments.

Figure 2A:
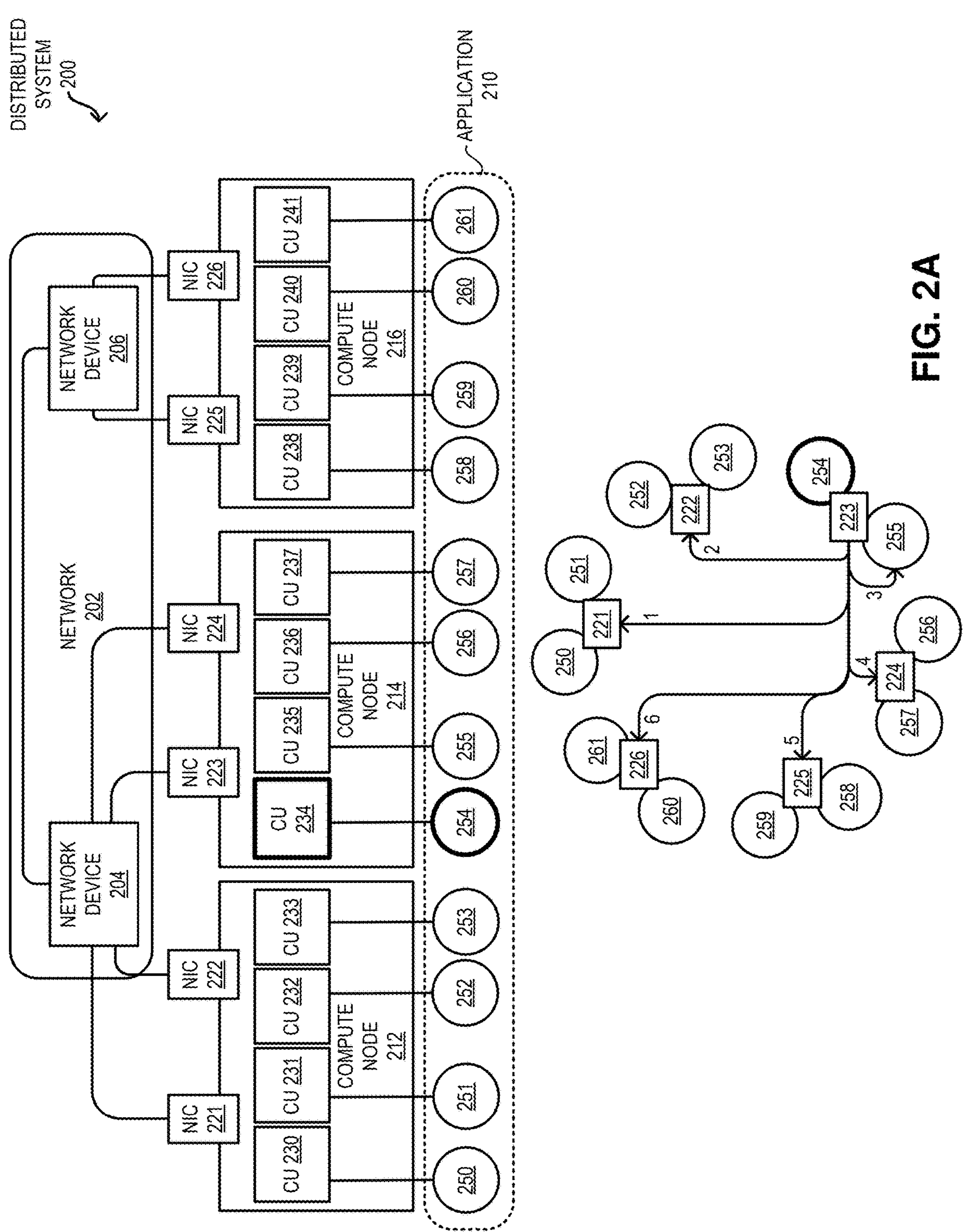
FIG. 2A illustrates an example of utilizing the node architecture for efficient one-sided communication in a distributed system, in accordance with an aspect of the present application.

FIG. 2A illustrates an example of utilizing the node architecture for efficient one-sided communication in a distributed system, in accordance with an aspect of the present application. A distributed system 200 can include compute nodes 212, 214, and 216. Distributed system 200 may include a network 202 that can couple compute nodes 212, 214, and 216 to each other. A respective compute node can include one or more computing units, such as CPUs, GPUs, and TPUs. Furthermore, a respective node can be equipped with a plurality of NICs. The computing units and the NICs in a node can be coupled to each other via corresponding intra-node interconnects (e.g., CPU interconnects, such as NVLink, Infinity fabric, XeLinks, or QuickPath interconnects). In this example, node 212 can include computing units 230, 231, 232, and 233, and NICs 221 and 222; node 214 can include computing units 234, 235, 236, and 237, and NICs 223 and 224; and node 216 can include computing units 238, 239, 240, and 241, and NICs 225 and 226. Network 202 may include an inter-node fabric, such as Slingshot, InfiniBand, or Elastic fabric. Nodes 212, 214, and 216 may operate in conjunction with each other via network 202 to facilitate an HPC environment.

Here, network 202 may include a set of network devices 204 and 206. Node 212 can be coupled to network device 204 via NICs 221 and 222. Even though NICs 221 and 222 can be coupled to the same network 202, they provide distinct inter-node links that can transfer data simultaneously. Similarly, node 214 can be coupled to network device 202 via NICs 223 and 224, and node 216 can be coupled to network device 206 via NICs 225 and 226. Currently, large-scale computations associated with a distributed operation of an application 210 can be distributed among a plurality of processes of application 210. In this example, processes 250, 251, 252, 253, 254, 255, 256, 257, 258, 259, 260, and 261 of application 210 may be executed on corresponding computing units 230, 231, 232, 233, 234, 235, 236, 237, 238, 239, 240, and 241, respectively.

Since nodes 212, 214, and 216 include multiple NICs, a respective NIC may be associated with a subset of the computational units. For example, in node 212, computing units 230 and 231 can be associated with NIC 221, and computing units 232 and 233 can be associated with NIC 222 (e.g., based on physical closeness on the backplane or motherboard of node 212). Similarly, in node 214, computing units 234 and 235 can be associated with NIC 223, and computing units 236 and 237 can be associated with NIC 224. In node 216, computing units 238 and 239 can be associated with NIC 225, and computing units 240 and 241 can be associated with NIC 226.

In this example, process 254 can be the source process (denoted with increased line weight), and the rest of the processes can be the target processes. Hence, process 254 can send data elements from a source buffer (e.g., in the memory of node 214) to the respective destination buffers of the target processes. To send a data element, process 254 can insert the data element into a source buffer and notify NIC 223. NIC 223 can then send the data element to a respective target process. Subsequently, NIC 223 can receive a transmission-complete acknowledgment from the target NIC associated with the target process. Since transmission-complete acknowledgments may not guarantee the completion of the delivery to the destination buffer, there might be pending data elements in the queue (e.g., in the PCIe bar).

To ensure that the entire set of data elements is delivered to the destination buffers, process 254 can send a flush instruction to the target NICs. Upon receiving the flush instruction, the target NICs can deliver any pending data elements to respective destination buffers. To further enhance the process, process 254 may issue flush instructions for individual NICs of distributed system 200 instead of individual processes of application 210. In particular, a respective node of nodes 212, 214, and 216 may include a memory subsystem. Hence, sending a single flush instruction for individual NICs can be sufficient to deliver pending data elements to corresponding destination buffers. It should be noted that if a node includes a plurality of memory systems (e.g., one for its CPU and another for its GPU), process 254 may need to issue a flush instruction for a respective memory system. For example, instead of issuing respective flush instructions for processes 250 and 251, process 254 can issue a flush instruction to NIC 221. In FIG. 2A, the flush instruction is denoted with a "1," which indicates the sequence of the flush instructions generated from process 254. Based on the flush instruction, NIC 221 can deliver any pending data elements from process 254 to the respective destination buffers of processes 250 and 251. Process 254 may use round-robin selection (e.g., sequential selection) to select the processes for the subsequent flush instruction.

Accordingly, process 254 can issue the next flush instruction (denoted with a "2") to NIC 222 for processes 252 and 253. Since process 254 can share its NIC 223 with process 255, process 254 can send the next flush instruction (denoted with a "3") to process 255 via NIC 223. Process 254 can then issue a flush instruction (denoted with a "4") to NIC 224 for processes 256 and 257; another flush instruction (denoted with a "5") to NIC 225 for processes 258 and 259; and a subsequent flush instruction (denoted with a "6") to NIC 226 for processes 260 and 261. In this way, the flush operations in distributed system 200 can utilize the architecture of nodes 212, 214, and 216 to efficiently flush all processes associated with individual target NICs using a single flush instruction.

Figure 2B:
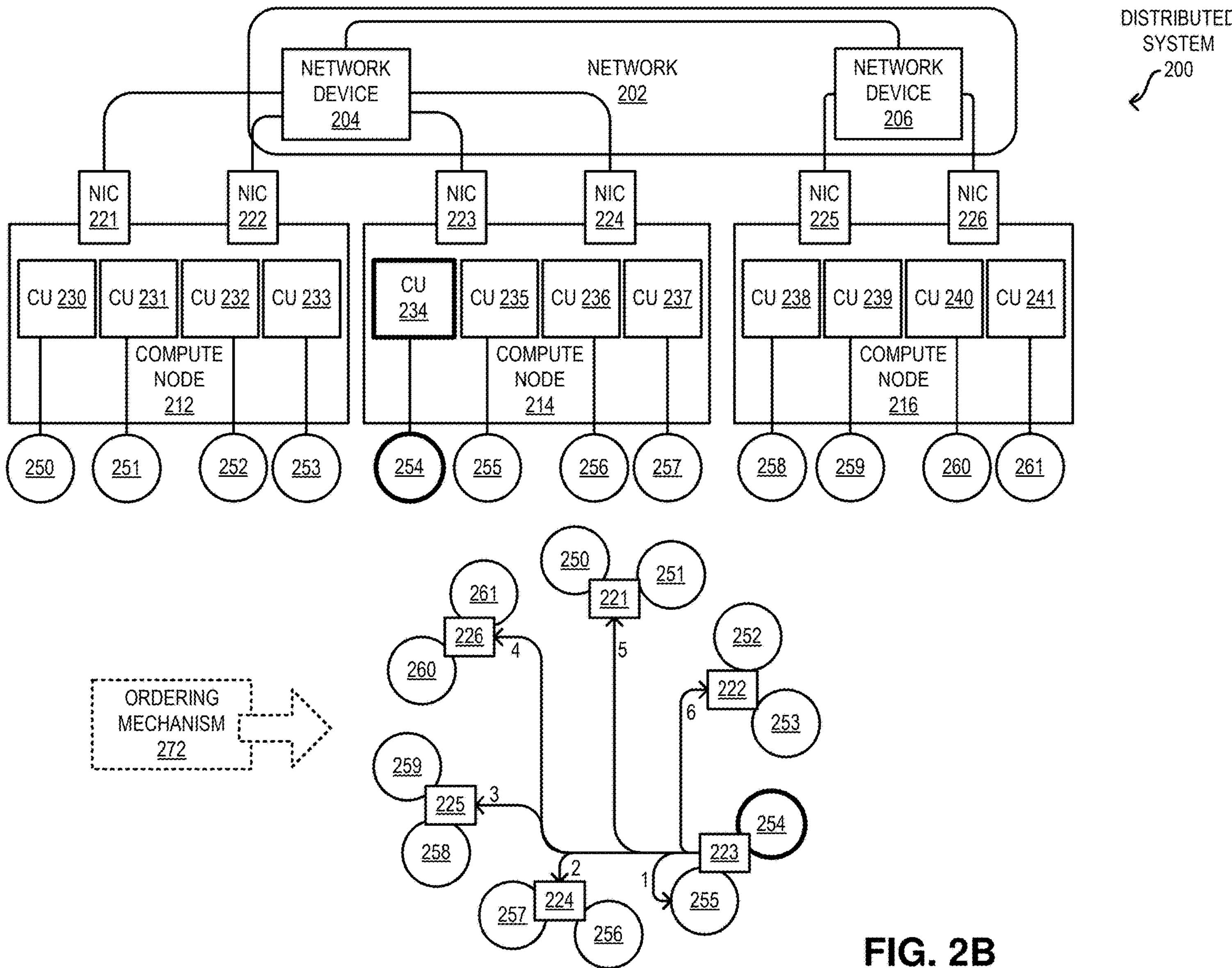
FIG. 2B illustrates an example of sequence-based incast management for efficient one-sided communication in a distributed system, in accordance with an aspect of the present application.

FIG. 2B illustrates an example of sequence-based incast management for efficient one-sided communication in a distributed system, in accordance with an aspect of the present application. If a target process receives flush operations from a plurality of flush operations in an epoch, the target NIC may incur incast. To reduce contention, process 254 can apply an ordering mechanism 272. Ordering mechanism 272 may dictate that a source process with an identifier N may start sending flush instructions to the NIC associated with the target process with an identifier N+1. When the last process identifier among the target processes is reached, the source process may circle back to itself by starting from the first process identifier. Accordingly, process 254 can sequentially send the flush operations to the target processes that have a greater process identifier. For example, process 254 may send a flush instruction to NIC 223 associated with process 255. In FIG. 2B, the flush instruction is denoted with a "1," which indicates the sequence of the flush instructions generated from process 254.

Subsequently, process 254 can issue a flush instruction (denoted with a "2") to NIC 224 for processes 256 and 257. Process 254 can then issue a flush instruction (denoted with a "3") to NIC 225 for processes 258 and 259, and a subsequent flush instruction (denoted with a "4") to NIC 226 for processes 260 and 261. Upon reaching process 261, process 254 may circle back to itself. Accordingly, process 254 can issue a flush instruction (denoted with a "5") to NIC 221 for processes 250 and 251, and a subsequent flush instruction (denoted with a "6") to NIC 222 for processes 252 and 253. Hence, even when multiple source processes issue the flush instructions in the epoch, the flush instructions can be issued to different NICs of distributed system 210. In this way, one-sided communication from multiple sources processes in distributed system 210 may avoid incast.

Figure 2C:
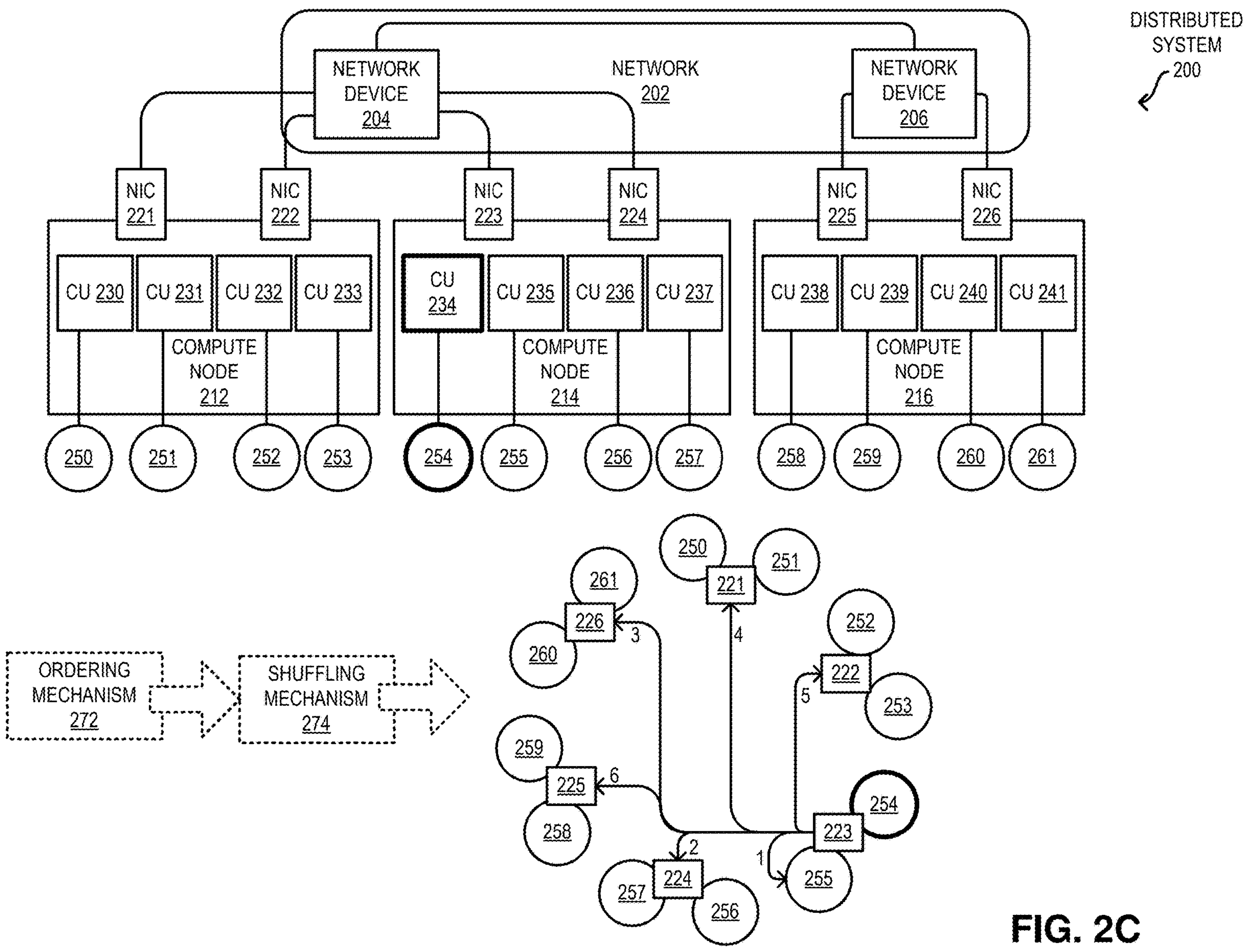
FIG. 2C illustrates an example of shuffling-based incast management for efficient one-sided communication in a distributed system, in accordance with an aspect of the present application.

FIG. 2C illustrates an example of shuffling-based incast management for efficient one-sided communication in a distributed system, in accordance with an aspect of the present application. If the number of processes associated with a distributed operation is large, a shuffling mechanism 274 can be applied on the sequence of flush instructions generated based on ordering mechanism 272. Shuffling mechanism 274, such as the Fisher-Yates shuffling mechanism, may provide additional randomization to the sequence of flush instructions, which may further reduce incast in distributed system 200. In the example in FIG. 2B, ordering mechanism 272 can generate a sequence of NICs for receiving the flush instruction as NICs 223, 224, 225, 226, 221, and 222. When shuffling mechanism 274 is applied to this sequence, a randomized sequence of NICs for receiving the flush instruction can be generated as NICs 223, 224, 226, 221, 222, and 225.

Accordingly, process 254 may send a flush instruction to NIC 223 associated with process 255. In FIG. 2C, the flush instruction is denoted with a "1," which indicates the sequence of the flush instructions generated from process 254. Subsequently, process 254 can issue a flush instruction (denoted with a "2") to NIC 224 for processes 256 and 257. Process 254 can then issue a flush instruction (denoted with a "3") to NIC 226 for processes 260 and 261, and a subsequent flush instruction (denoted with a "4") to NIC 221 for processes 250 and 251. Process 254 can then issue a flush instruction (denoted with a "5") to NIC 222 for processes 252 and 253, and a subsequent flush instruction (denoted with a "6") to NIC 225 for processes 258 and 259.

Figure 3:
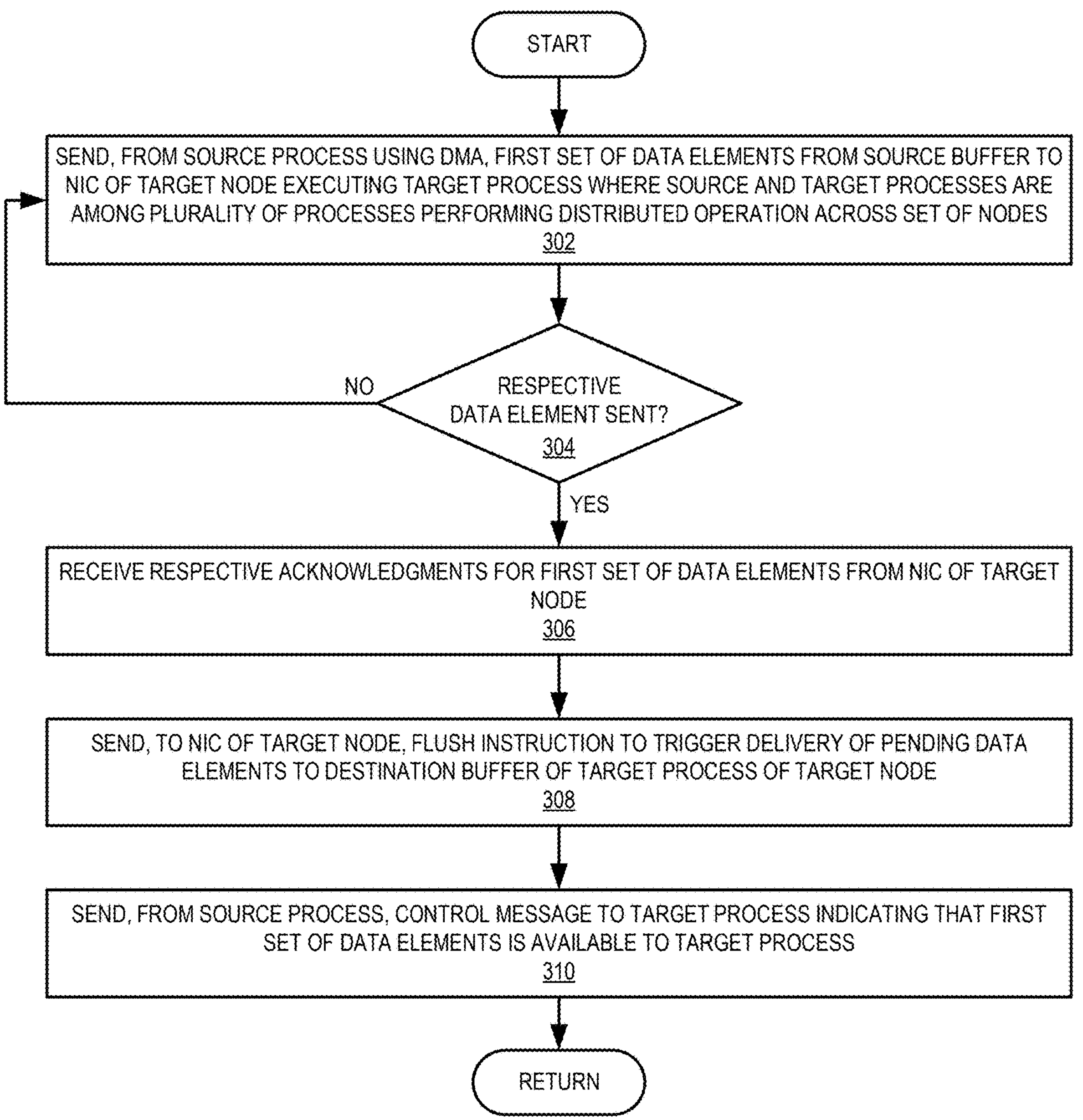
FIG. 3 presents a flowchart illustrating an example of a process of a source node performing efficient one-sided communication with a target node in a distributed system, in accordance with an aspect of the present application.

FIG. 3 presents a flowchart illustrating an example of a process of a source node performing efficient one-sided communication with a target node in a distributed system, in accordance with an aspect of the present application. During operation, the source node can send, from a source process using direct memory access (DMA), a first set of data elements from a source buffer to the NIC of a target node executing a target process (operation 302). Here, the source and target processes can be among a plurality of processes performing a distributed operation across a set of nodes. The set of nodes can be the nodes of a distributed system, such as an HPC environment. Each node can be equipped with a set of computing units. A respective process can run on a corresponding computing unit. In the example in FIG. 1B, source node 114 can execute source process 152, and node 116 can be the target node with NIC 125. Here, the first set of data elements can correspond to the set of data elements 160.

The source node can determine whether a respective data element of the first set of data elements is sent (operation 304). Typically, the source process can insert the first set of data elements into a source buffer (e.g., in the memory of the source node). When a respective data element from the source buffer is sent, the source node can determine that a respective data element of the first set of data elements is sent. These data elements can be sent sequentially without waiting for a preceding acknowledgment. If a respective data element of the first set of data elements is not sent, the source node can continue to send the data elements from the first set of data elements (operation 302).

On the other hand, subsequent to sending a respective data element of the first set of data elements, the source node can receive respective acknowledgments for the first set of data elements from the NIC of the target node (operation 306). Without waiting for individual acknowledgments, the source node can send the entire first set of data elements. As a result, the source node may start receiving acknowledgments while the source node is still sending the first set of data elements. The source node may continue to receive acknowledgments until a respective data element of the first set of data elements is acknowledged. In the example in FIG. 1B, node 114 can receive respective acknowledgments for data elements 162, 164, 166, and 168, such as acknowledgments 176 and 178. These acknowledgments can be transmission-complete acknowledgments. Hence, there can be pending data elements in the cache of the NIC of the target node.

Hence, the source node can send, to the NIC of the target node, a flush instruction to initiate (or trigger) the delivery of the pending data elements from the queue, such as the PCIe bar, to the destination buffers of the target processes of the target node (operation 308). The flush instruction can also be based on DMA, such as a zero-payload RDMA PUT request. When the NIC of the target node receives the flush instruction, the target NIC can provide the flush instruction to the PCIe system. The flush instruction may include an instruction for the PCIe system of the target node to complete the flush operation. Since the PCIe system can deliver the data elements to the destination buffer in order, the PCIe system can flush all pending data elements from the queue and deliver the data elements to the destination buffer. In the example in FIG. 1B, node 114 can send a flush instruction 182 to NIC 125 of node 116. Flush instruction 182 can trigger the delivery of pending data element 168 to the destination buffer associated with process 154.

The source node can then send, from the source process, a control message to the target process indicating that the first set of data elements is available to the target process (operation 310). Here, the source process may send the control message to the target process to indicate that the first set of data elements is delivered to the destination buffer and, hence, is available for the target process. Therefore, the control message can indicate that the target process may consume (or retrieve) the first set of data elements from the destination buffer. Based on the signal, the target process can consume the first set of data elements. In the example in FIG. 1B, node 114 can send a signal 186 to process 154, which can then consume data elements 160.

Figure 4:
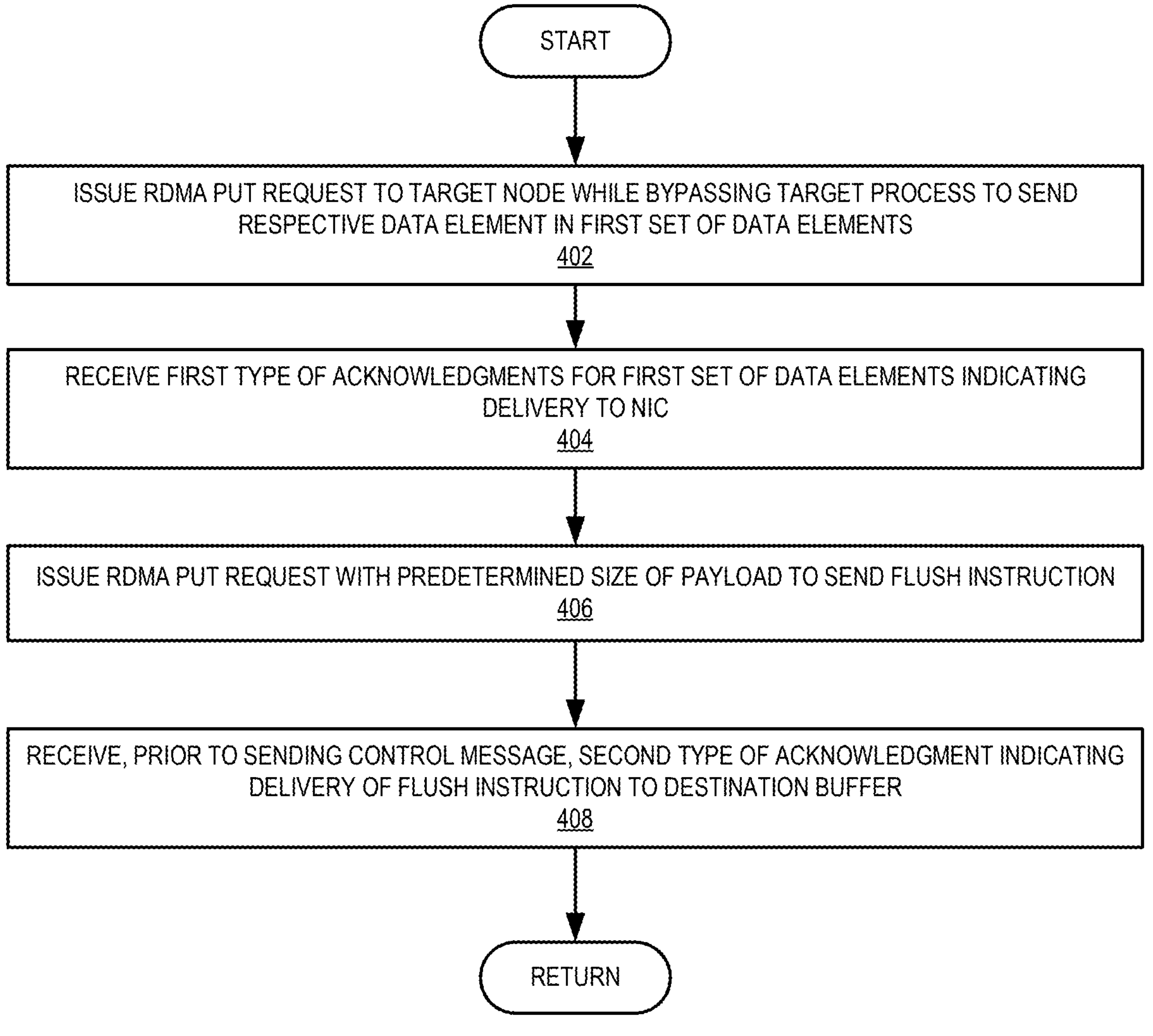
FIG. 4 presents a flowchart illustrating an example of a process of a source node utilizing acknowledgments in efficient one-sided communication, in accordance with an aspect of the present application.

FIG. 4 presents a flowchart illustrating an example of a process of a source node utilizing acknowledgments in efficient one-sided communication, in accordance with an aspect of the present application. During operation, the source node can issue an RDMA PUT request to the target node while bypassing the target process to send a respective data element in the first set of data elements (operation 402). The RDMA PUT is a write request issued by the NIC of the source node. The write request can indicate the data element and a location (e.g., in the destination buffer) for placing the data element. The NIC of the target node can receive the data element from the write request, store it in a queue (e.g., the PCIe bar), and subsequently write the data element at the location. Here, the RDMA PUT request can correspond to the DMA operation of FIG. 3. The RDMA PUT request can allow the source node to place the data element in the target node without a corresponding receiving operation at the target process.

The source node can then receive the first type of acknowledgments for the first set of data elements indicating the delivery to the NIC of the target node (operation 404). The first type of acknowledgments can be transmission-complete acknowledgments, such as acknowledgments 176 and 178 of FIG. 1B. Hence, the first type of acknowledgment can indicate that the corresponding transmission is complete but may not indicate the data delivery to the destination buffers is complete. Since the target NIC can generate the acknowledgment upon completion of the transmission of the data element, sending the transmission-complete acknowledgment instead of a delivery-complete acknowledgment can speed up the data delivery process.

The source node can then issue an RDMA PUT request with a predetermined size of payload (e.g., a zero-payload RDMA PUT) to send the flush instruction (operation 406). When the NIC of the target node receives the zero-payload RDMA PUT, the NIC can determine it as the flush instruction (e.g., flush instruction 182 in FIG. 1B). Upon receiving the zero-payload RDMA PUT, the NIC of the target node can provide the flush instruction to the PCIe system of the target node. This RDMA PUT may include an instruction for the PCIe system to complete the flush operation. Accordingly, the PCIe system can deliver the data elements to the destination buffer of the target process.

Subsequently, the source node can receive, prior to sending the control message (e.g., the control message of FIG. 3), a second type of acknowledgment indicating the delivery of the flush instruction to the destination buffer (operation 408). Since the flush instruction can be used to deliver data elements to the target process, the second type of acknowledgment can be a delivery-complete acknowledgment, such as acknowledgment 184 of FIG. 1B. Consequently, upon receiving the delivery-complete acknowledgment, the NIC of the source node can determine that the pending data elements are delivered to the destination buffer of the target process. The source node can then send the control message indicating that the target process may consume (or retrieve) the first set of data elements from the destination buffer.

Figure 5:
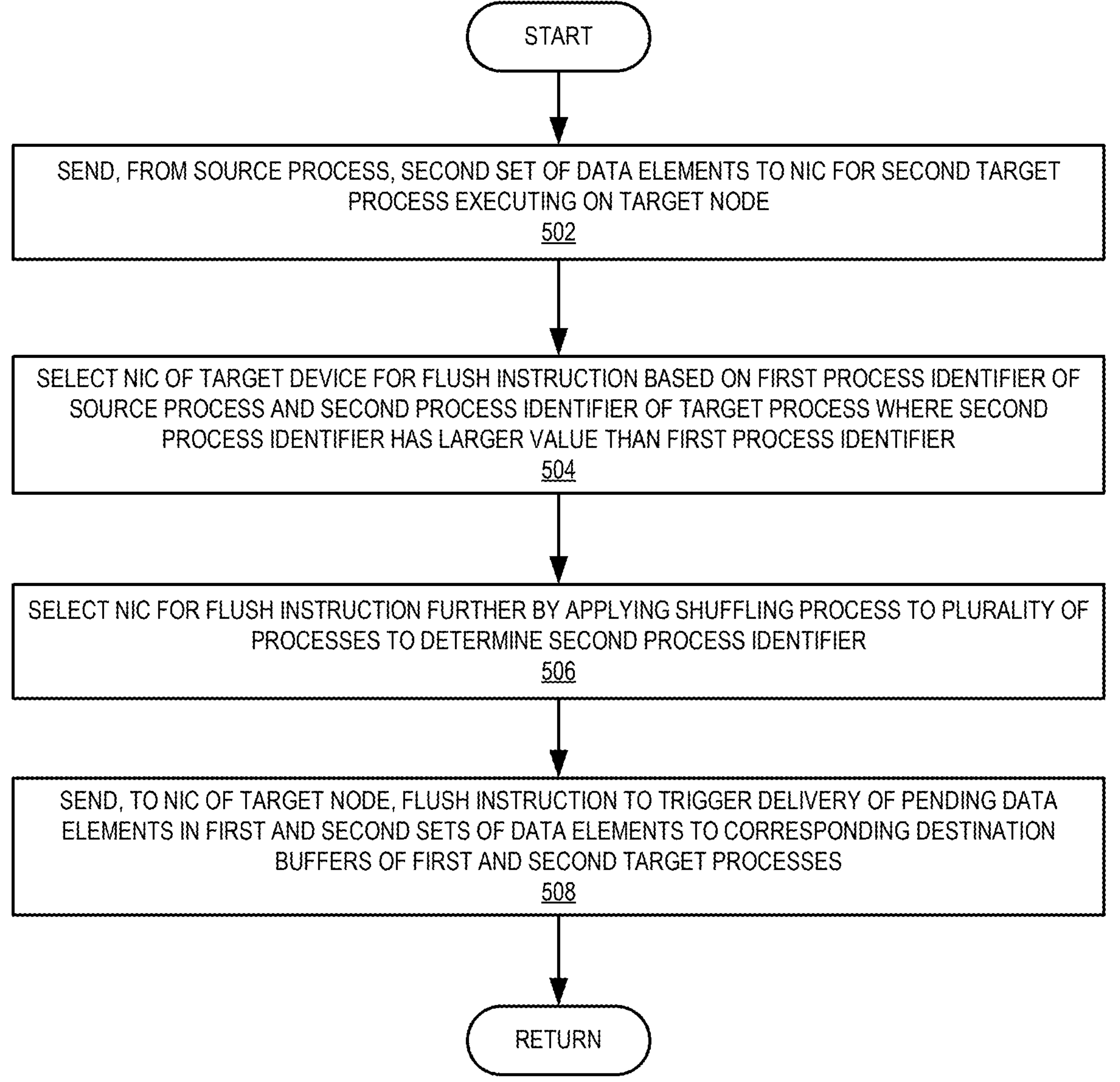
FIG. 5 presents a flowchart illustrating an example of a process of a source node performing incast management for efficient one-sided communication in a distributed system, in accordance with an aspect of the present application.

FIG. 5 presents a flowchart illustrating an example of a process of a source node performing incast management for efficient one-sided communication in a distributed system, in accordance with an aspect of the present application. Typically, a source process can send data elements to several target processes. During operation, the source node can send, from the source process, a second set of data elements to the NIC for a second target process executing on the target node (operation 502). Here, the target process (e.g., the target process of FIG. 3) and the second target process can be among the several target processes. Therefore, the source node can send the second set of data elements to the NIC of the target node. In the example in FIG. 2A, target node 216 can execute a plurality of target processes 258, 259, 260, and 261. These processes can correspond to the first and second target processes of FIG. 5.

The source node can then select the NIC of the target device for the flush instruction based on the first process identifier of the source process and a second process identifier of the target process where the second process identifier has a larger value than the first process identifier (operation 504). To reduce contention with other source processes, the source process can sequentially send the flush instructions to the target processes that have a greater process identifier. For example, a process with an identifier N may start sending flush instructions to the NIC associated with the target process with an identifier N+1. In FIG. 2B, an ordering mechanism 272 can determine a sequence of flush instructions. Here, the sequence can indicate that the process identifier of the target process (e.g., process 256) can have a larger value than the process identifier of the source process (e.g., process 254).

The source node may also select the NIC for the flush instruction further by applying the shuffling process to the plurality of processes to determine the second process identifier (operation 506). The shuffling process, such as the Fisher-Yates shuffling mechanism, may provide additional randomization to the sequence of flush instructions, which may further reduce incast. Here, the processes can correspond to the plurality of processes of FIG. 3. The shuffling process can shuffle the sequence of processes and can correspond to the shuffling mechanism 274 of FIG. 2C.

The source node can send, to the NIC of the target node, a flush instruction to trigger the delivery of the pending data elements in the first and second sets of data elements to corresponding destination buffers of the first and second target processes (operation 508). In the examples in FIGS. 2B and 2C, when NIC 224 receives a flush instruction, the respective pending data elements can be delivered to processes 256 and 257. Since the target process and the second target process can be associated with the NIC, a single flush instruction to the NIC can cause the PCIe system of the target node to deliver the pending data elements of the first and second sets of data elements.

Figure 6:
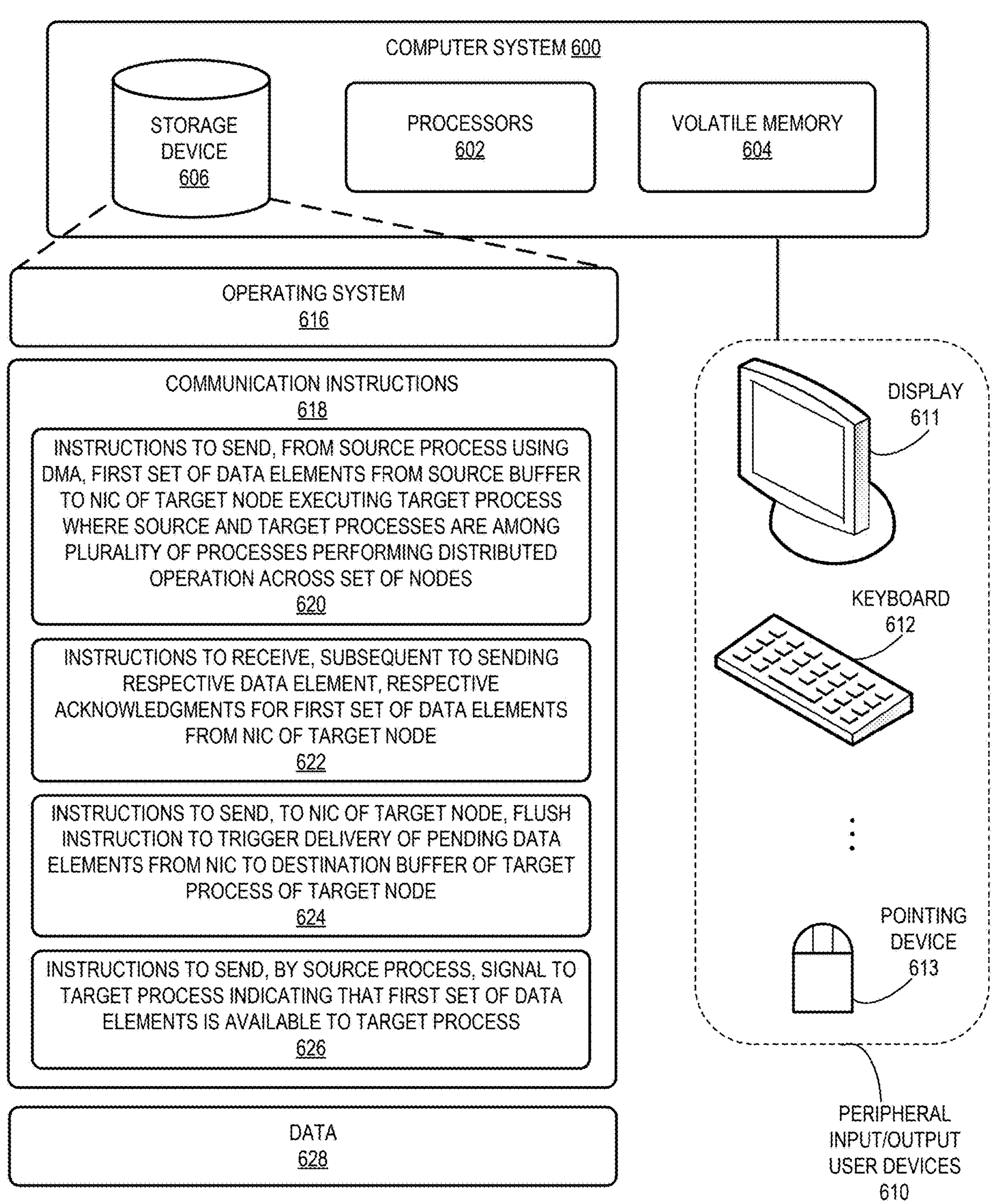
FIG. 6 illustrates an example of a computing system facilitating efficient one-sided communication in a distributed system, in accordance with an aspect of the present application.

FIG. 6 illustrates an example of a computing system facilitating efficient one-sided communication in a distributed system, in accordance with an aspect of the present application. Computer system 600 includes one or more processors 602, a memory 604, and a storage device 606. Processors 602 can include one or more processing resources, such as processor cores, GPUs, and TPUs. Memory 604 can include a volatile memory (e.g., random access memory (RAM)) that serves as a managed memory and can be used to store one or more memory pools.

Furthermore, computer system 600 can be coupled to peripheral I/O user devices 610 (e.g., a display device 611, a keyboard 612, and a pointing device 613). Storage device 606 includes a non-transitory computer-readable storage medium and stores an operating system 616, communication instructions 618, and data 630. Computer system 600 may include fewer or more entities or instructions than those shown in FIG. 6.

Communication instructions 618 can include instructions, which when executed by computer system 600, can cause computer system 600 to perform methods and/or processes described in this disclosure. Computer system 600 can be a compute node, such as node 114 in FIGS. 1A and 1B. Specifically, communication instructions 618 may include instructions 620 to send, from a source process using DMA, a first set of data elements from a source buffer to the NIC of a target node executing a target process. Here, the source and target processes are among a plurality of processes performing a distributed operation across a set of nodes. In the example in FIG. 1B, source node 114 can execute source process 152, and node 116 can be the target node with NIC 125. Here, the first set of data elements can correspond to the set of data elements 160.

Communication instructions 618 may also include instructions 622 to receive, subsequent to sending a respective data element of the first set of data elements, respective acknowledgments for the first set of data elements from the NIC of the target node. In the example in FIG. 1B, node 114 can receive respective acknowledgments for data elements 162, 164, 166, and 168, such as acknowledgments 176 and 178. Furthermore, communication instructions 618 may also include instructions 624 to send, to the NIC of the target node, a flush instruction to trigger the delivery of the pending data elements to the destination buffers of the target processes of the target node (e.g., flush instruction 182 of FIG. 1B can trigger the delivery of pending data element 168 to the destination buffer associated with process 154).

Communication instructions 618 may include instructions 626 to send, from the source process, a signal to the target process indicating that the first set of data elements is available to the target process. For example, node 114 of FIG. 1B can send a signal 186 to process 154, which can consume data elements 160. Data 628 can include any data that is required as input, or that is generated as output by the methods, operations, communications, and/or processes described in this disclosure. Specifically, data 630 can include process instances of an application and the data elements associated with a respective epoch. Data 630 can also include the sequence of flush instructions and a shuffled sequence.

Computer system 600 and communication instructions 618 may include more instructions than those shown in FIG. 6. For example, communication instructions 618 can also store instructions for NIC 123 of FIG. 1A delivering an acknowledgement to source process 154; process 152 of FIG. 1B waiting for respective acknowledgments of data elements 160; delivering pending data elements to process 154 of FIG. 1B; process 154 sending flush instructions for individual NICs of FIG. 2A; process 154 determining a sequence for sending flush instructions for individual NICs of FIG. 2B; process 154 shuffling the sequence for sending flush instructions for individual NICs of FIG. 2C, the operations depicted in the flowcharts of FIGS. 3, 4, and 5; and the instructions of non-transitory CRM 700 in FIG. 7.

FIG. 7 illustrates an example of a CRM facilitating efficient one-sided communication in a distributed system, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to send, from a source process using DMA, a first set of data elements from a source buffer to the NIC of a target node executing a target process. Here, the source and target processes are among a plurality of processes performing a distributed operation across a set of nodes. Here, source and target processes can correspond to processes 152 and 154 of FIG. 1B, respectively. Furthermore, the first set of data elements can correspond to data elements 160 of FIG. 1B.

CRM 700 can also include instructions 712 to receive, subsequent to sending a respective data element of the first set of data elements, respective acknowledgments for the first set of data elements from the NIC of the target node. In the example in FIG. 1B, process 152 can receive respective acknowledgments for data elements 162, 164, 166, and 168. CRM 700 can include instructions 714 to send, to the NIC of the target node, a flush instruction to trigger the delivery of the pending data elements to the destination buffers of the target processes of the target node (e.g., flush instruction 182 of FIG. 1B can trigger the delivery of pending data element 168 to the destination buffer associated with process 154). CRM 700 can additionally include instructions 716 to send, from the source process, a signal to the target process indicating that the first set of data elements is available to the target process. For example, node 114 of FIG. 1B can send a signal 186 to process 154, which can consume data elements 160.

CRM 700 may include more instructions than those shown in FIG. 7. For example, CRM 700 can also store instructions for NIC 123 of FIG. 1A delivering an acknowledgement to source process 154; process 152 of FIG. 1B waiting for respective acknowledgments of data elements 160; delivering pending data elements to process 154 of FIG. 1B; process 154 sending flush instructions for individual NICs of FIG. 2A; process 154 determining a sequence for sending flush instructions for individual NICs of FIG. 2B; process 154 shuffling the sequence for sending flush instructions for individual NICs of FIG. 2C, the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a computing node in a distributed system. During operation, the node can send, from a source process using DMA, a first set of data elements from a source buffer to a NIC of a target node executing a target process. Here, the source and target processes may be among a plurality of processes performing a distributed operation across a set of nodes. Subsequent to sending the first set of data elements, the node can receive respective acknowledgments for the first set of data elements from the NIC. The node can then send, to the NIC of the target node, a flush instruction to trigger the delivery of pending data elements to a destination buffer of the target process of the target node. Subsequently, the node can send, from the source process, a control message to the target process indicating that the first set of data elements is available to the target process.

In a variation on this aspect, the node may send the first set of data elements by issuing a remote direct memory access (RDMA) PUT request to the target node while bypassing the target process.

In a further variation, the flush instruction may include an RDMA PUT request with a predetermined size of payload.

In a variation on this aspect, the node can send, from the source process for a second target process executing on the target node, a second set of data elements to the NIC. Here, the flush instruction can trigger the delivery of the pending data elements in the first and second sets of data elements to corresponding destination buffers of the first and second target processes.

In a variation on this aspect, the acknowledgments for the first set of data elements can be a first type of acknowledgment indicating delivery of the data element to the NIC.

In a further variation, prior to sending the control message, the node can receive a second type of acknowledgment indicating delivery of the flush instruction to the destination buffer.

In a variation on this aspect, the node can select the NIC for the flush instruction based on a first process identifier of the source process and a second process identifier of the target process. Here, the second process identifier can have a larger value than the first process identifier.

In a further variation, the node can select the NIC for the flush instruction by applying a shuffling process to the plurality of processes to determine the second process identifier.

In a variation on this aspect, the first set of data elements can be associated with a first epoch of the distributed operation. The destination buffer can then store a third set of data elements associated with a second epoch of the distributed operation upon processing of the first set of data elements.

In a variation on this aspect, the NIC can be coupled to the target node via a peripheral component interconnect express (PCIe) interface. The flush instruction can then cause the pending data elements to be transferred from a PCIe bar to the destination buffer in a memory of the target node.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

sending, by a source process using direct memory access, a first set of data elements from a source buffer at the source node to a network interface controller (NIC) of a target node executing a target process, the source and target processes being among a plurality of processes performing a distributed operation across a set of nodes comprising the source and target nodes;

subsequent to sending the first set of data elements, receiving, by the source process, an acknowledgment for each of the first set of data elements from the NIC;

sending, by the source process to the NIC, a flush instruction that instructs the NIC to perform a flush operation, wherein the flush operation comprises delivering pending data elements from the NIC to a destination buffer of the target process of the target node; and sending, by the source process, a control message to the target process indicating that the first set of data elements is available to the target process.

2. The method of claim 1, wherein sending the first set of data elements comprises issuing a remote direct memory access (RDMA) PUT request to the target node while bypassing the target process for a respective data element.

3. The method of claim 2, wherein the flush instruction comprises an RDMA PUT request with a predetermined size of payload.

4. The method of claim 1, further comprising sending, by the source process for a second target process executing on the target node, a second set of data elements to the NIC, wherein the flush operation comprises delivering the pending data elements in the first and second sets of data elements to corresponding destination buffers of the target process and the second target process.

5. The method of claim 1, wherein the acknowledgments for the first set of data elements are acknowledgments of a first type indicating delivery of the data element to the NIC.

6. The method of claim 5, further comprising, prior to sending the control message, receiving, by the source process, acknowledgment of a second type indicating delivery of the pending data elements to the destination buffer.

7. The method of claim 1, further comprising selecting, by the source process, the NIC for the flush instruction based on a first process identifier of the source process and a second process identifier of the target process, the second process identifier having a larger value than the first process identifier.

8. The method of claim 7, wherein selecting the NIC for the flush instruction further comprises applying a shuffling process to the plurality of processes to determine the second process identifier.

9. The method of claim 1, wherein the first set of data elements is associated with a first epoch of the distributed operation, and wherein the destination buffer is to store a third set of data elements associated with a second epoch of the distributed operation upon processing of the first set of data elements.

10. The method of claim 1, wherein the NIC is coupled to the target node via a peripheral component interconnect express (PCIe) interface, and wherein the flush operation comprises transferring the pending data elements from a PCIe bar to the destination buffer in a memory of the target node.

11. A computing node, comprising:

a processing resource;

a memory; and a non-transitory computer-readable storage medium storing instructions that when executed by the processing resource cause the computing node to perform a method, the method comprising:

sending, from a source process using direct memory access, a first set of data elements from a source buffer at the computing node to a network interface controller (NIC) of a target node executing a target process, the source and target processes being among a plurality of processes performing a distributed operation across a set of nodes comprising the computing node and the target node;

subsequent to sending the first set of data elements, receiving, by the source process, an acknowledgment for each of the first set of data elements from the NIC;

sending, by the source process to the NIC, a flush instruction that instructs the NIC to perform a flush operation, wherein the flush operation comprises delivering pending data elements from the NIC to a destination buffer of the target process in a memory of the target node; and sending, by the source process, a control message to the target process indicating that the first set of data elements is available to the target process.

12. The computing node of claim 11, wherein sending the first set of data elements further comprises issuing a remote direct memory access (RDMA) PUT request to the target node while bypassing the target process for a respective data element.

13. The computing node of claim 12, wherein the flush instruction comprises an RDMA PUT request with a predetermined size of payload.

14. The computing node of claim 11, wherein the method further comprises sending, from the source process for a second target process executing on the target node, a second set of data elements to the NIC, wherein the flush operation comprises delivering the pending data elements in the first and second sets of data elements to corresponding destination buffers of the target process and the second target process.

15. The computing node of claim 11, wherein the acknowledgments for the first set of data elements are acknowledgments of a first type indicating delivery of the data element to the NIC.

16. The computing node of claim 15, wherein the method further comprises receiving, by the source process prior to sending the control message, acknowledgment of a second type indicating delivery of the pending data elements to the destination buffer.

17. The computing node of claim 11, wherein the method further comprises selecting, by the source process, the NIC for the flush instruction based on a first process identifier of the source process and a second process identifier of the target process, the second process identifier having a larger value than the first process identifier.

18. The computing node of claim 17, wherein the method further comprises selecting the NIC for the flush instruction by applying a shuffling process to the plurality of processes to determine the second process identifier.

19. The computing node of claim 11, wherein the first set of data elements is associated with a first epoch of the distributed operation, and wherein the destination buffer is to store a third set of data elements associated with a second epoch of the distributed operation upon processing of the first set of data elements.

20. A non-transitory computer-readable storage medium storing instructions that when executed by a processor of a computing device cause the processor to:

send, from a source process using direct memory access, a first set of data elements from a source buffer at the source node to a network interface controller (NIC) of a target node executing a target process, the source and target processes being among a plurality of processes performing a distributed operation across a set of nodes comprising the source and target nodes;

subsequent to sending the first set of data elements, receive, by the source process, an acknowledgment for each of the first set of data elements from the NIC indicating delivery of the first set of data elements to the NIC;

send, by the source process to the NIC, a flush instruction that instructs the NIC to perform a flush operation, wherein the flush operation comprises delivering pending data elements from the NIC to a destination buffer of the target process in a memory of the target node; and send, by the source process, a control message to the target process indicating that the first set of data elements is available to the target process.

* * * * *